United States Patent Office 2,901,022
Patented Aug. 25, 1959

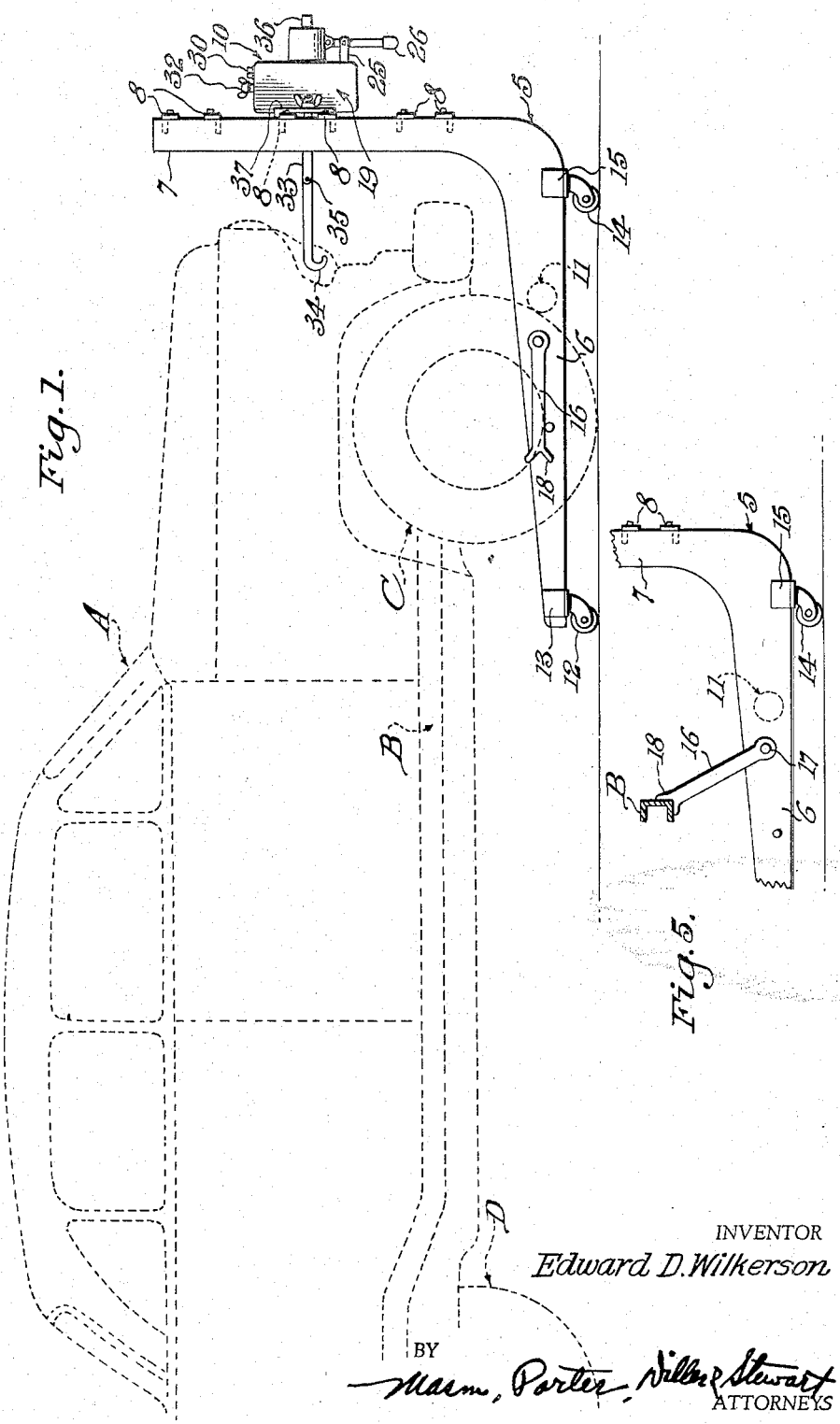

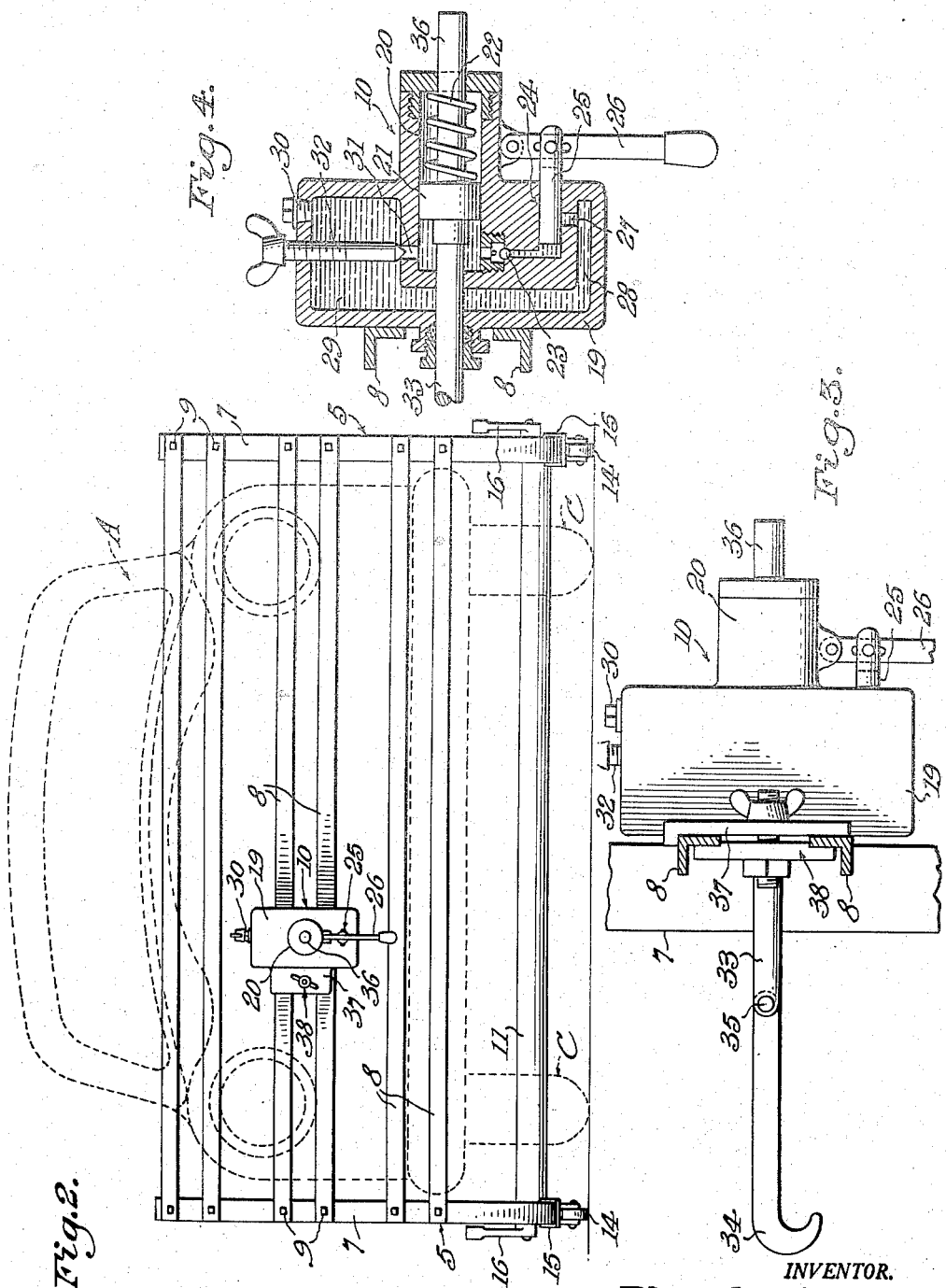

2,901,022

APPARATUS FOR CORRECTING COLLISION DAMAGE

Edward D. Wilkerson, Northfield, N.J.

Application October 6, 1953, Serial No. 384,470

14 Claims. (Cl. 153—32)

The invention relates generally to certain new and useful improvements in automotive accessories and primarily seeks to provide a novel method of and apparatus for correcting collision damage in automobiles or the like.

Under presently congested traffic conditions collisions and the resulting damaging of automobiles are becoming an exasperating and expensive problem. Present automobile styling aggravates the problems and the cost of replacement and repair work, and the provision of efficient methods and mechanical means for facilitating and expediting the reshaping of damaged automobile parts is recognized as a crying need. It is a purpose of the present invention to provide a practical apparatus of the character stated, and also a novel method of carrying out the necessary reshaping or re-positioning of damaged parts.

An object of the invention is to provide a novel method of the character stated which comprises, connecting a draft device to a distorted automobile part and exerting a force in a direction for pulling the part toward its prior shape while exerting a reaction force through said device in an opposite direction against another part of the automobile.

Another object of the invention is to provide a method of the character stated wherein the reaction force is directed in such angular relation to the automobile part against which the reaction force is applied as to hold the part reshaping force in its intended line.

Another object of the invention is to provide a method of the character stated wherein the part shaping force is applied in a generally horizontal direction and the reaction force is applied in an opposite direction against an opposing lower wheel quarter so as to be effective to hold the draft device from swinging upwardly out of the intended line of the part reshaping force.

Another object of the invention is to provide a novel apparatus for practicing the method and including a frame structure rollable over a supporting floor and composed of L-shaped side members spaced to be able to straddle front or rear wheel assemblies and including uprights to which traversing horizontal support bar means are attached, at least one draft device adjustably mounted on the bar means and adapted for connection with distorted automobile parts for pulling them in a reshaping direction, and means on the frame structure and engageable with an automobile part for applying a reaction force thereto in a direction opposite that of the applied reshaping force.

Another object of the invention is to provide an apparatus of the character stated wherein the draft device is in the form of an hydraulic jack to the plunger of which is attached a traction element adapted for connection with an automobile part which is to be reshaped.

Another object of the invention is to provide an apparatus of the character stated wherein the mean engageable with an automobile part for applying a reaction force thereto comprises means mounted on the frame structure and engageable against lower quarter sections of the wheels of a front or rear wheel assembly of an automobile.

A further object of the invention is to provide an apparatus of the character stated wherein each of the L-shaped frame structure side members presents a horizontal base portion and an upright bar supporting portion, supporting roller means being mounted at the free end of each said base portion and also at the juncture of each said base portion and the respective upright portion, and the means engageable with the lower quarter sections of wheel assemblies being mounted on the frame member horizontal base portions and intermediately of the roller means thereon.

A still further object of the invention is to provide an apparatus of the character stated wherein each of the frame structure side members carries means engageable with chassis portions of an automobile when the apparatus is applied toward a side portion of an automobile, thereby to direct the reaction forces applied during a part reshaping process against said chassis portions.

With the above and other objects in view that will hereinafter appear, the nature of the invention will be more clearly understood by reference to the following detailed description, the appended claims and the several views illustrated in the accompanying drawing.

In the drawing:

Figure 1 is a side elevation illustrating the invention, an automobile which is to have collision damage thereon corrected being somewhat diagrammatically shown.

Figure 2 is a front elevation.

Figure 3 is an enlarged fragmentary vertical cross section illustrating one of the draft devices and its adjustable mounting on the frame side member traversing angle bars.

Figure 4 is a view similar to Figure 3 showing the draft device in section.

Figure 5 is a fragmentary view illustrating how the pivotally mounted resistor arms engage an automobile chassis portion when the apparatus is applied transversely with relation to the chassis.

In the example of embodiment of the invention herein disclosed, an automobile which is to have collision damage thereon corrected is somewhat diagrammatically illustrated at A, the chassis thereof being indicated at B, the front wheel assembly at C and the rear wheel assembly at D.

The apparatus for carrying out the improved method of collision correction is shown as including a frame struction composed of parallel L-shaped side members generally designated 5 and each including a horizontal base portion 6 and an upright support portion 7. The uprights 7 are traversed and connected by parallel spaced sets of angle bars 8 secured at their ends as at 9 to said uprights and forming supports for adjustably mounting draft devices one only of which is shown and generally designated 10. These draft devices may be of various forms, but it is preferred that they shall comprise a draft device in the nature of a hydraulic jack means such as is shown in detail in Figures 3 and 4.

It will be apparent by reference to Figures 1 and 2 of the drawings that the frame side base portions are joined by a traversing member 11 secured at its ends to and extending between the base portions 6 in position for engaging under lower quarter sections of the wheels of an automobile front wheel assembly in the manner illustrated in Figure 1. Figure 1 shows engagement with a front wheel assembly, but it is to be understood that the apparatus can be positioned for straddling the wheels of a rear wheel assembly with the traversing member 11 similarly engaging lower quarter sections of said wheels.

A caster wheel 12 is mounted as at 13 at the free end of each frame side base portion 6, and a caster wheel 14 is mounted as at 15 at the juncture of each said base portion and its connected upright portion 7 in the manner clearly illustrated in Figure 1. These caster wheels or rollers facilitate the rolling of the apparatus about a supporting floor, and the positioning thereof with relation to the automombile to be manipulated, at the front or rear end thereof or at either side. When the apparatus is to be applied transversely with relation to an automobile or at a side thereof, the purpose of resisting the pull of the draft device is taken over by substitute means serving a purpose similar to that of the previously described element 11. For this purpose, arms 16 are pivotally mounted as at 17 on the frame side base portions 6, each said arm having a forked portion 18 at its free end and placeable against a chassis portion in the manner clearly illustrated in Figure 5.

The example draft device shown in detail in Figures 3 and 4 includes a housing 19 having a cylinder portion 20 in which a piston 21 is reciprocably mounted. The piston is constantly urged in one direction, a return direction, by a compression spring 22, and it is adapted to be actively moved in the opposite direction by pressure fluid entering through a check valve 23 from a pump cylinder 24 wherein a pump plunger 25 is reciprocably mounted. The pump plunger 25 may be reciprocated by manipulation of the pivotally mounted lever 26 and is adapted to over-travel an inlet port 27 communicating with an extension 28 of the pressure fluid reservoir 29.

It will be apparent that each time the lever 26 is swung to retract the plunger 25 and admit pressure fluid through the port 27 into the cylinder 24, and then is swung in the opposite direction to project said plunger, pressure fluid will be forced through the check valve 23 and into the cylinder 20 to force the piston 21 to the right.

The reservoir is equipped with a filler plug 30, and there is also included a release port 31 communicating between the interior of the cylinder 20 beneath the piston 21 and the overlying reservoir. The release port 31 is controlled by a valve 32 which may be manipulated to release pressure fluid from beneath the piston 21 and permit the spring 22 to project the piston.

A traction plunger 33 extends from the piston 21 and has a hook 34 pivotally connected thereto as at 35 and adapted to facilitate connection of the draft plunger with a distorted automobile part which is to be reshaped. The piston may also have a pusher plunger extension which may be connected in any suitable manner for applying a thrust in a part re-shaping operation. It will be apparent that successive manipulation of the lever 26 will serve to move the piston 21 and the connected plunger extensions 33 and 36 step-by-step in the effecting of a part reshaping operation, and after a reshaping process has been wholly or partially completed, the release valve 32 may be manipulated to allow the spring 22 to return the piston 21 to its initial position.

It will be apparent by reference to Figure 3 that the draft device may include bracket flange extensions 37 adjustably clamped as at 38 to the angle bars 34. By reason of the provision of such equipment one or more draft devices can be mounted at selected levels on the mounting bar sets, and at selected positions along said bar sets, thereby permitting connection of the draft devices with distorted automobile parts at various positions and levels.

In practicing the invention, the apparatus can be placed at the front end of an automobile and straddling the wheels of the front wheel assembly in the manner illustrated in Figure 1, or the apparatus can be similarly positioned at the rear of the automobile. It is to be understood that the apparatus can also be placed at side portions of the automobile, in which placement resistance to the distorted part reshaping draft applications can be offered by the resistor arms 16 applied to the chassis in the manner indicated in Figure 5 rather than by the engagement of the traversing member 11 with lower quarter wheel sections as indicated in Figure 1.

After the apparatus has been applied in the manner just above described, and the draft devices have been suitably connected with the distorted automobile parts which are to be reshaped, manipulation of the lever in the manner previously described will serve to impart movement to the plunger 33 and the connected hook 34 effective to bring about the desired reshaping of the parts. It will be noted that the reshaping force or pull is exerted in a generally horizontal direction, and that an opposite force is applied by the traversing member 11 or by the resistor arms 16. As previously described, these reaction or resistor forces are applied in such angular relation to the engaged automobile parts as to hold the distorted reshaping forces in the intended line. For example, when the traversing member 11 engages with lower quarter sections of wheels C, as indicated in Figure 1, the generally horizontal traction applied by the hook 34 and which is effective toward the right as viewed in Figure 1 is opposed by a force applied toward the left by the traversing member 11 against the wheels C. Any tendency of the traction force to lift the frame side members 5 will be resisted by the wedging relation of said member 11 with the contacted sections of the wheels C. It will be apparent that any upward swinging of the frame members 5 will have to fulcrum about the casters 12, and movement of the traversing member 11 would be present by overhanging portions of the wheels.

From the foregoing, it will be apparent that the generally horizontal frame structure portions 6 singly and collectively provide a base member providing in each instance two reaction surfaces at the positions of the rollers 12 and 13. The members 11 and 16 comprise reaction means secured to the base member intermediately of the two reaction surfaces 12 and 13 in a generally horizontal direction, said surfaces 12 and 13 being at a higher level than the reaction surfaces, or in other words, intermediately in a vertical direction between the plane in which said two reaction surfaces lie and the plane in which the force applying means 33 is located. Thus when the force applying means 33 is connected at 34 with a vehicle part to be reshaped and reshaping force is applied, the force reacting means 11 or 16 engaged with a lower wheel quarter as in Figure 1, or with a vehicle frame part as at B in Figure 5 will apply a reaction force effective to hold the base member 6 against the floor in opposition to any tendency to swing upwardly about either of the reaction surfaces or fulcra provided by the rollers 12 and 14.

Reference has been made herein to force resisting contact of apparatus parts with automobile wheels, and with portions of an automobile chassis. It is to be understood that the invention also comprehends force resisting contact of apparatus parts with other portions of automobile structures, an example being contact with the automobile bumpers when such parts are not included in the distorted portions which are to be reshaped.

While example method steps, and an example apparatus have been disclosed herein, it is to be understood that variations in said steps and in the structural features disclosed may be made without departing from the spirit and scope of the invention as defined in the appended claims.

I claim:

1. Apparatus for correcting collison damage in an automobile or the like and comprising, a supporting frame structure rollable over a supporting floor and composed of L-shaped side members spaced to be able to straddle front or rear wheel assemblies and each including a horizontal base portion and an upright portion, support bar means traversing the frame structure and secured on said upright portions, at least one draft device mounted on said bar means and having provision for connection with a distorted automobile part for pulling it in a reshaping direction, and means on the base portions and engageable with an automobile part for applying a force thereagainst in a direction opposite that of the applied reshaping pull.

2. Apparatus as defined in claim 1 wherein the draft device is in the form of an hydraulic jack including a reciprocable plunger having attached thereto a traction element adapted for connection with an automobile part which is to be reshaped.

3. Apparatus as defined in claim 1 in which the support bar means comprises parallel spaced bars horizontally traversing and secured to the frame side member uprights, and wherein is included means for adjustably securing the draft device for selective placement along said bars.

4. Apparatus as defined in claim 1 wherein a supporting roller is mounted at the free end of each side frame member base portion and also proximate the juncture of each said base portion and its connected upright portion, and wherein the means engageable with the lower quarter sections of wheels is mounted on the base portion of each side frame member between the rollers thereon.

5. Apparatus as defined in claim 1 wherein the draft device is in the form of an hydraulic jack including a reciprocable plunger having attached thereto a traction element adapted for connection with an automobile part which is to be reshaped, reciprocable pump plunger means for forcing fluid against the traction plunger for moving it in one direction, spring means constantly tending to move the traction in the opposite direction, and means for releasing fluid from behind the traction plunger to permit the spring to move the same.

6. Apparatus as defined in claim 1 wherein the means on the base portions for engaging an automobile part comprises forked arm means swingable into position for engaging the automobile chassis.

7. Apparatus as defined in claim 1 in which the support bar means comprises parallel spaced bars horizontally traversing and secured to the frame side member uprights, and wherein is included means for adjustably securing the draft device for selective placement along said bars, said bars being arranged in multiple sets each at a distinct level permitting selective mounting of the draft device and connection thereof with distorted automobile parts at various positions and levels.

8. In apparatus for correcting collision damage in an automobile resting upon a base, the combination of a draft device, means resting at two spaced points on the base for supporting said draft device, means adjustably mounting the draft device on said supporting means so that it can be placed on said supporting means at a selected position vertically and laterally with respect to and opposite a distorted automobile part, means for effecting connection of the draft device with said part so that manipulation of the draft device will exert a force in a direction for pulling the part toward its prior shape, and means on said supporting means and engageable at two widely spaced points with stationary portions of the automobile for pressing directly thereagainst and exerting thereagainst a reaction force in a direction opposite the part reshaping force, said draft device being supported on the device supporting means in position to exert its part reshaping force in a generally horizontal direction and said means engageable with stationary portions of the automobile for exerting the reaction force being supported on said device supporting means in position to apply the reaction force against opposing lower wheel quaters so that when it is drawn against the wheels its engagement with the wheels will be effective to exert a downward force component and hold the supporting means against the supporting base and the draft device from swinging upward out of the intended line of the part reshaping force.

9. In apparatus for correcting collision damage in a vehicle resting upon a floor, a supporting frame structure including a generally horizontal base member and an upright member connected to said base member, a force applying means, means for connecting the force applying means to a vehicle part to be reshaped, means for selectively supporting and positioning the force applying means on said upright member to adapt it for applying a force at an angle upward, at an angle downward or in a generally horizontal direction, two reaction surfaces on said base member engageable with the floor and spaced apart in the general direction of force application by said force applying means, and a rigid force reaction means secured to the base member intermediately of said two reaction surfaces in a generally horizontal direction and intermediately in a vertical direction between the plane in which said two reaction surfaces lie and the plane in which said force applying means is located and adapted to engage a rigid part of the vehicle below the point of application of force by said force applying means, whereby upon connection of said force applying means with a vehicle part to be reshaped and the application of reshaping force a reaction force will be applied by said force reaction means by reason of its contact with said vehicle part and the application of said reshaping force and effective to hold the base member against the floor in opposition to any tendency to swing upwardly about one or the other of said reaction surfaces accordingly as the force application by said force applying means is in one or another of said angles and direction.

10. Apparatus as defined in claim 9 wherein the force reaction means comprises a member supported by the base member in position for engaging an opposing lower wheel quarter on the vehicle being worked upon to cause said wheel quarter to impose a downward force component against the reaction member as said reaction member is forced thereagainst in reaction to the application of force by the force applying means.

11. Apparatus as defined in claim 9 wherein the force reaction means comprises a rigid elongated member pivotally mounted on the base member in position for being engageable with a frame part of the vehicle being worked upon.

12. Apparatus as defined in claim 9 wherein the means for selectively supporting and positioning the force applying means comprises transverse elongated bars supported at selective levels on the upright member of the frame structure and means for mounting the force applying means for selective positioning along said bars.

13. In apparatus for correcting collision damage in an automobile resting upon a base, the combination of a draft device, means resting at two spaced points on the base for supporting said draft device, means adjustably mounting the draft device on said supporting means so that it can be placed on said supporting means at a selected position vertically and laterally with respect to and opposite a distorted automobile part, means for effecting connection of the draft device with said part so that manipulation of the draft device will exert a force in a direction for pulling the part toward its prior shape, and means on said supporting means and engageable at two widely spaced points with stationary portions of the automobile for pressing directly thereagainst and exerting thereagainst a reaction force in a direction opposite the part reshaping force, said first mentioned two spaced points being spaced apart in the general direction of the line of pull, and said last mentioned two widely spaced points being spaced apart transversely with relation to the line of pull.

14. Apparatus as defined in claim 13 wherein the reaction force exerting means is engageable with the lower part of the automobile and includes rigid elongated members pivotally mounted on said supporting means intermediately of said two spaced base contacting points and adapted to be raised to a position less than a ninety degree angle with relation to said base for engagement with frame parts of the automobile so as to hold the draft device supporting means downward against the base when said draft device is actuated.

References Cited in the file of this patent

UNITED STATES PATENTS

| | | |
|---|---|---|
| 1,611,738 | Guilford | Dec. 21, 1926 |
| 1,676,263 | Hawkins | July 10, 1928 |
| 1,749,806 | Fisher | Mar. 11, 1930 |
| 2,442,604 | Johnson et al. | June 1, 1948 |
| 2,597,103 | Johnson et al. | May 20, 1952 |
| 2,597,234 | Elam | May 20, 1952 |
| 2,608,730 | Killius | Sept. 2, 1952 |
| 2,634,788 | Harteker et al. | Apr. 14, 1953 |
| 2,750,983 | Rogers | June 19, 1956 |

FOREIGN PATENTS

| | | |
|---|---|---|
| 392,347 | Germany | Mar. 20, 1924 |